Patented Apr. 21, 1936

2,038,390

UNITED STATES PATENT OFFICE 2,038,390

RESISTANCE WELDING ELECTRODE

Horace F. Silliman, Waterbury, Conn., assignor to The American Brass Company, Waterbury, Conn., a corporation of Connecticut No Drawing. Application March 14, 1935, Serial No. 11,065

4 Claims. (Cl. 219—4)

My invention relates to the art of electrical resistance welding of metals and more particularly to an improvement in the dies, electrodes, and splines used therein.

Wherever the word "electrodes" is used hereinafter, it is understood to mean any electrode, die, spline, die inset or die facing used in electrical resistance welding apparatus.

In the art of electrical resistance welding, two pieces of metal are joined together by causing local softening or melting at the surfaces of contact of the two pieces of metal at the same instant that a heavy mechanical pressure is applied. In practice this is accomplished by pressing the pieces to be joined between one or more pairs of electrodes which are connected in a suitable electrical circuit. As the electrodes of each pair are brought toward each other and touch the pieces of metal to be joined, the circuit is completed and a heavy electric current passes. The current heats the joint to the proper temperature and the pressure of the electrodes consolidates the weld. As soon as the electrodes are drawn apart again, the circuit is broken and the resistance weld is completed.

Heretofore, the electrodes have often been made of copper because of its high electrical conductivity. Copper is a soft metal, however, and the high pressures used soon bend such electrodes and cause their ends to spread out and crack.

Many attempts have been made to overcome this difficulty by using some of the harder alloys of copper as a material for electrodes. Among the most successful have been the cadmium-copper alloys known commercially as "Hitenso", and beryllium copper. Electrodes made from these materials are quite strong and resistant to deformation by pressure, but are usually so low in electrical conductivity that they heat up excessively when used continuously.

I have found that electrodes made of copper-base alloys of the compositions within the narrow range:

| | |
|---|---|
| Beryllium | .01% to 2.50% |
| Cadmium | .10% to 1.5 % |
| Copper | Balance | are free from certain disadvantages of other electrodes, and have a high ratio of electrical conductivity to strength. For example, using an alloy containing approximately

| | Percent |
|---|---|
| Copper | 94.4 |
| Cadmium | 0.47 |
| Beryllium | 0.13 | a tensile strength of about 68,000 lbs./in.$^2$ and a conductivity of 68% I. A. C. S. was obtained, while an alloy containing approximately

| | Percent |
|---|---|
| Copper | 97.65 |
| Cadmium | 0.20 |
| Beryllium | 2.15 | can be brought to a tensile strength of 190,000 lbs./in.$^2$ and a conductivity of 20% I. A. C. S. Within this range an electrode with just the right combination of strength and conductivity can be selected for any specific purpose by the selection of an alloy of the proper combination of copper, cadmium, and beryllium within the composition limits specified above.

Electrodes may be made from this alloy without difficulty by any of the well known processes of casting, rolling, drawing, forging, pressing, and swaging. All or part of the fabrication of my new electrode may be carried out at elevated temperatures. It is an advantage in some cases, however, to finish the fabrication by cold working in order to realize the benefits of the resulting strain hardening. The alloys containing approximately 1.0% to 2.50% beryllium also respond to precipitation hardening heat treatments whereby the hardness, tensile strength and related properties and electrical conductivity are improved by the usual quenching and reheating processes, for example by quenching from above 550° C. and then reheating in the range of temperature about 250° C. to 550° C. This heat treatment also increases the electrical conductivity. It is considered within the scope of this invention to obtain the required mechanical properties in these electrodes by any combination of mechanical treatment, as stated in this paragraph, heat treatment or precipitation hardening treatment, which may prove most satisfactory for any given requirements.

The principal advantage of my new electrode over the "Hitenso" electrode results from its greater strength and consequent resistance to deformation, while the principal advantage over the "beryllium copper" electrode lies in its higher electrical conductivity and the saving made possible by the substitution of cadmium for part of the expensive beryllium.

Having thus set forth the nature of my invention, what I claim is:

1. A resistance welding electrode formed from an alloy containing approximately 0.10% to 1.5% cadmium, 0.01% to 2.5% beryllium, balance copper by weight.

2. A heat hardened resistance welding electrode formed from an alloy containing approximately 0.10% to 1.5% cadmium, 1.0% to 2.5% beryllium, balance copper.

3. A pressure-exerting electrode of the class described having a hard, wear-resisting contact surface of an alloy of about 0.10 to 1.5% cadmium, .01% to 2.5% beryllium, balance copper by weight.

4. A heat hardened resistance welding electrode having a hard wear-resisting contact surface of an alloy of about .10 to 1.5% cadmium, 1.0 to 2.5% beryllium, balance copper by weight.

HORACE F. SILLIMAN.